US008240018B2

(12) United States Patent
Walter et al.

(10) Patent No.: US 8,240,018 B2
(45) Date of Patent: Aug. 14, 2012

(54) DEVICE FOR PULLING OUT A TERMINAL CLAMP

(75) Inventors: Frank Walter, Blumberg (DE); Hermann Stadler, Donaueschingen (DE)

(73) Assignee: MC Technology GmbH, Blumberg (DE)

( * ) Notice: Subject to any disclaimer, the term of this patent is extended or adjusted under 35 U.S.C. 154(b) by 690 days.

(21) Appl. No.: 12/320,165

(22) Filed: Jan. 21, 2009

(65) Prior Publication Data

US 2009/0188095 A1 Jul. 30, 2009

(30) Foreign Application Priority Data

Jan. 25, 2008 (DE) ........................ 10 2008 006 258

(51) Int. Cl.

| | |
|---|---|
| ***B23P 19/04*** | (2006.01) |
| ***B25B 27/00*** | (2006.01) |
| ***B25B 27/14*** | (2006.01) |
| ***B25B 1/00*** | (2006.01) |
| ***H01R 13/00*** | (2006.01) |

(52) U.S. Cl. ................ 29/278; 29/270; 29/244; 29/276; 29/257; 269/3; 269/6; 439/483; 439/484

(58) Field of Classification Search .................... 29/244, 29/270, 278, 257, 276, 271; 269/3, 6, 143, 269/249; 80/3.07, 3.08, 3.27; 439/483, 484, 923, 482, 476.1

See application file for complete search history.

(56) References Cited

U.S. PATENT DOCUMENTS 3,817,078 A * 6/1974 Reed et al. .................... 606/138
2002/0173203 A1* 11/2002 Cisey ............................ 439/701
2005/0001439 A1* 1/2005 Lukaszynski et al. ....... 294/99.2
2007/0059953 A1 3/2007 Togami et al.
2008/0057797 A1* 3/2008 Siglock et al. ................ 439/816

FOREIGN PATENT DOCUMENTS

DE 34 26 783 C2 1/1986
DE 3426783 A1 * 1/1986
DE 10 2005 050 267 B4 4/2007
EP 0 349 133 A1 1/1990
JP 2006-100008 A 4/2006
WO WO 96/01509 A1 1/1996
WO WO 2005/053102 A2 6/2005

* cited by examiner

*Primary Examiner* — Monica Carter
*Assistant Examiner* — Seahee Yoon
(74) *Attorney, Agent, or Firm* — The Nath Law Group; Jerald L. Meyer; Robert T. Burns

(57) ABSTRACT

The invention relates to a device for pulling out a terminal clamp with a fastening section for fastening the device to the terminal clamp and a grip section. The fastening section and the grip section are connected by a pivotable connection. A second fastening device for detachable fastening of the grip section to the terminal clamp is provided on this grip section.

21 Claims, 2 Drawing Sheets

DEVICE FOR PULLING OUT A TERMINAL CLAMP

FIELD OF THE INVENTION

The present subject matter relates to a device for pulling out a terminal clamp.

BACKGROUND

Known terminal clamps can be inserted with plug contacts into pin contact strips in a plug-in direction. Such a plug connection can be released by pulling on the terminal clamp in the direction opposite the plug-in direction.

It is often possible to pull terminal clamps out of pin contact strips only with a great force. Because of the small dimensions of terminal clamps, it is difficult to grip the terminal clamps correctly.

Additional straps attached to the terminal clamps facilitate the gripping and extraction of the terminal clamps. The strips protrude away from the terminal clamp in the plug-in direction so they are easy to grip. These straps are usually rather long and stand out rigidly. They may cause interference and are only rarely used.

With known terminal clamps, the attachment of the straps is accomplished by ultrasonic welding of the strap to the terminal clamp. Such a welded connected is expensive, inflexible and irreversible.

FIG. 1 shows a known device 2 for pulling out a terminal clamp 10'. The terminal clamp 10' has a cuboid housing. Plug contacts are attached to a plug side of the housing and can be inserted into a pin contact strip in a plug-in direction SR. Four walls of the housing are aligned essentially parallel to the plug-in direction SR and are connected to the plug side on each lower side. On the opposite upper sides, the four walls are connected to a visible side. The visible side is opposite the plug side. The device 2 for pulling out the terminal clamp 10' is attached to one of the four walls.

The device 2 has a grip section 40' and a fastening section 30'. The fastening section 30' is welded to the terminal clamp 10' and is in surface contact with one of the four walls of the terminal clamp 10'. Welding of the device 2 to the terminal clamp 10' is an expensive finishing step and furthermore, the welded joint is also not readily reversible.

The device 2 is designed essentially as a rectangle with a grip section 40' and a fastening section 30'. As a result, the grip section 40' necessary protrudes away from the terminal clamp 10'. If several such terminal clamps 10' are now inserted side by side into a pin contact strip or the like, then several grip sections 40' protrude together. The protruding grip sections 40' make it difficult to access a neighboring terminal clamp or to pull out a neighboring terminal clamp.

Another disadvantage of the known device 2 for pulling out terminal clamps 10' is that it significantly increases the size of the terminal clamps 10'. As FIG. 1 shows, the length in the plug-in direction SR of the terminal clamp 10' is more than doubled by the protruding grip section 40'.

SUMMARY

The object of the present subject matter is to make available an inexpensive and space-saving device for pulling out a terminal clamp on a terminal clamp that is easy to attach.

The present subject matter makes it possible to pull out a terminal clamp by a device having a fastening section for fastening the device to the terminal clamp and having a grip section. The fastening section and the grip section are joined by a pivotable connection. A second fastening device for detachable fastening of the grip section to the terminal clamp is also provided.

The grip section advantageously does not necessarily stand out rigidly from the terminal clamp but instead is pivotable with respect to it. If the device is pivoted toward the terminal clamp, it can be detachably attached to the terminal clamp by means of the second fastening device.

When using such a device, the user has the advantage that he can stow the grip section when the device is not needed. To do so, he need only pivot the pivotable device. Furthermore, he can secure the pivoted grip section on the terminal clamp. The grip section advantageously remains stowed and does not stand up again on its own. If the user needs the device again, he can release said attachment, pivot the grip section away from the terminal clamp, pull on it and thereby pull out the terminal clamp.

The pivotable connection about which the grip section is pivotable is preferably designed as a divalent connection. In contrast with the device known from the state of the art, it prevents the grip section from breaking off because it does not transmit lateral forces perpendicular to the plug-in direction and perpendicular to the pivotable connection and the resulting torques about the pivotable connection with a corresponding arrangement. Lateral forces or torques about the pivotable connection might act in pulling out the terminal clamp, for example.

An advantageous embodiment of the device provides for the fastening section to have a first fastening device for detachable fastening of the device to the terminal clamp. One advantage of such a fastening mechanism is that an inflexible manufacturing step such as welding the fastening section onto the terminal clamp is eliminated. A second advantage of such a detachable connection is that after being used, the device can be used again for an external clamp.

In another advantageous embodiment, the first fastening mechanism is designed as a fastening contour. This fastening contour may advantageously be a dovetail, which is provided for working together in a dovetail joint, i.e., a tongue-and-groove joint.

The embodiment of the first fastening mechanism as a first fastening contour is inexpensive to manufacture and is easy for the user to handle.

In an advantageous embodiment, the first fastening mechanism is arranged on a first end of the device on a first edge of the fastening section facing away from the pivotable connection. The advantage of this arrangement is that the fastening section can therefore be designed to be especially short so that material can be saved.

In an advantageous embodiment, the pivotable connection between the fastening section and the grip section is designed as a film hinge. For such an embodiment, advantageously only a weakening of the material is needed and this can be achieved through appropriate shaping of the device.

In an advantageous embodiment, the second fastening mechanism is arranged on a second end of the device on a second edge of the grip section facing away from the pivotable connection. This is advantageous when the length of the grip section cannot be selected to be of just any length, so that the grip section does not protrude with a free end beyond the dimensions of the terminal clamp.

In an advantageous embodiment, the second facing mechanism is designed as a catch hook. It is advantageous that with such a catch mechanism, cooperating contours can be manufactured inexpensively and the catch mechanism is easily released by the user.

In an advantageous embodiment, grip strap is arranged on the grip section. Such a grip strap makes it easy for the user to release the second fastening mechanism and to grip the device. The grip strap is especially advantageously arranged at a grip angle to the grip section. Gripping of the grip strap by the user is facilitated in this way.

In an advantageous embodiment, the grip section and/or the grip strap has/have a structured surface. Such a surface structure may be designed in particular as ribbing. Elevations in ribbing are advantageously arranged across the plug-in direction. The grip section and/or the grip strap have/has a slip-proof surface in one advantageous embodiment. These surface features of the grip section and/or grip strap have in common the advantage that the device can be gripped especially well on the grip section and/or the grip strap and slippage is prevented. Structured surfaces such as ribbing have the special advantage that they may already be taken into account in the shaping of the device. Consequently, no additional manufacturing step is needed to apply a corresponding surface.

Advantageous embodiments of the device consist of a viscoelastic plastic. Plastics are advantageous to use because manufacturing of the inventive devices can be accomplished especially inexpensively using this material. Of the plastics, a viscoelastic plastic is especially advantageous to select because this permits a load-bearing design of the pivotable connection or edge as a film hinge. A device made of a polyamide [nylon] is especially advantageous because this yields cost advantages.

Advantageous exemplary embodiments of an inventive terminal clamp for insertion in a plug-in direction include a device for pulling out the terminal, such as that described in the preceding sections. For a user of such terminal clamps, this yields the advantage that the user finds a device for pulling out a terminal that is flexible to handle and can be arranged in a space-saving manner.

In an advantageous embodiment of an inventive terminal clamp, the housing is designed with two opposing side walls, a front wall, a rear wall, a visible side and a plug side. The visible side and the plug side are opposite one another and are arranged across the plug-in direction. The front wall, the rear wall and the side walls are aligned essentially parallel to the plug-in direction. In an advantageous embodiment, the terminal clamp has a second fastening element which works together with the second fastening mechanism of the device. It is especially advantageous that the inventive device can be not only brought into contact with the terminal clamp via the pivotable connection but can also be secured in such a locked position on the terminal clamp.

In an advantageous embodiment, the second fastening element is designed as a catch element corresponding to the catch hook of the device. Such catch elements can be provided advantageously through the shape of the terminal clamp without necessitating additional manufacturing steps or having to apply additional parts.

In another advantageous embodiment, the second fastening element is arranged on a visible edge between the visible side and the front wall. One advantage of this arrangement is that the sides of the housing remain free for additional function elements.

An advantageous embodiment of the terminal clamp has a first fastening element which works together with the first fastening mechanism of the device. Since the first fastening mechanism of the device in a preferred embodiment is provided for detachable fastening of the device on the terminal clamp, a corresponding mechanism is required on the terminal clamp, said mechanism being formed by the first fastening element. This yields the possibility of attaching the device to a terminal clamp without having to weld it in place, for example. The user gains flexibility in this way.

In an advantageous embodiment, the first fastening element is designed as a second fastening contour, which corresponds to the first fastening contour of the fastening section. This corresponding second fastening contour is designed especially advantageously as a negative dovetail. Such a negative dovetail works together with a positive contour reliably because of its contour in a tongue-and-groove connection. Such first fastening contours of the fastening section have in common the fact that they can be taken into account inexpensively in the shaping of the terminal clamp and therefore no additional parts need be attached and no subsequent surface treatments are required.

In an advantageous embodiment, the second-fastening contour is designed to lie across the plug-in direction. Such a second fastening contour works together with a corresponding contoured fastening mechanism which can be detachably attached in it. It is advantageous here to design the second fastening contour across the plug-in direction. The forces acting in the plug-in direction or opposite the plug-in direction may in this way be distributed along the fastening contour.

In an especially advantageous embodiment, the first fastening element is arranged on the rear wall. Since this rear wall is aligned in the plug-in direction, the forces are transmitted to the plug side especially advantageously in this direction to pull the plug contacts out of a pin contact strip.

In an advantageous embodiment of the terminal clamp, the visible side has operating openings to be able to pull out the electric conductors clamped in the terminal clamp after operating of an unlocking mechanism or a release mechanism.

In its grip area, the device is preferably in contact with the visible side of the terminal clamp in a closed position when the second fastening element works together with the first fastening mechanism. This yields protection for operating openings which may be arranged on the visible side. Protection of the operating openings by the device is especially advantageous because when working with tools in the near vicinity, a tool cannot then be accidentally inserted into an operating opening to operate the release mechanism and furthermore the operating openings cannot readily become soiled. Furthermore, such a closed position allows the user an arrangement of multiple terminal clamps on one pin contact strip or the like without an abundance of protruding grip sections as would be the case with known terminal clamps. This prevents mutual impairment of the terminal clamps on insertion or extraction.

BRIEF DESCRIPTION OF THE DRAWINGS

The invention is explained in greater detail below on the basis of an exemplary embodiment, in which.

DETAILED DESCRIPTION

Figure 1:
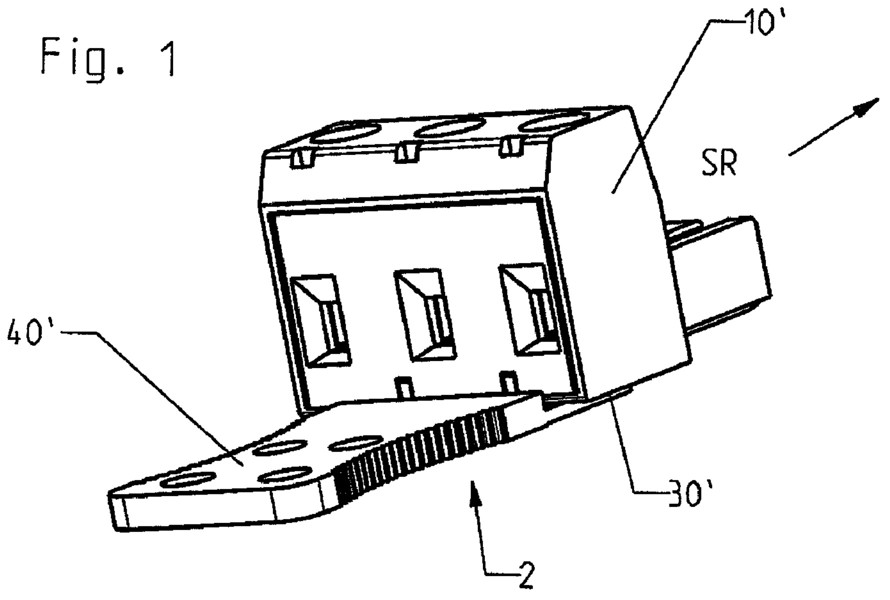
FIG. 1 shows a perspective diagram of a known device for pulling out a terminal clamp.
Figure 2:
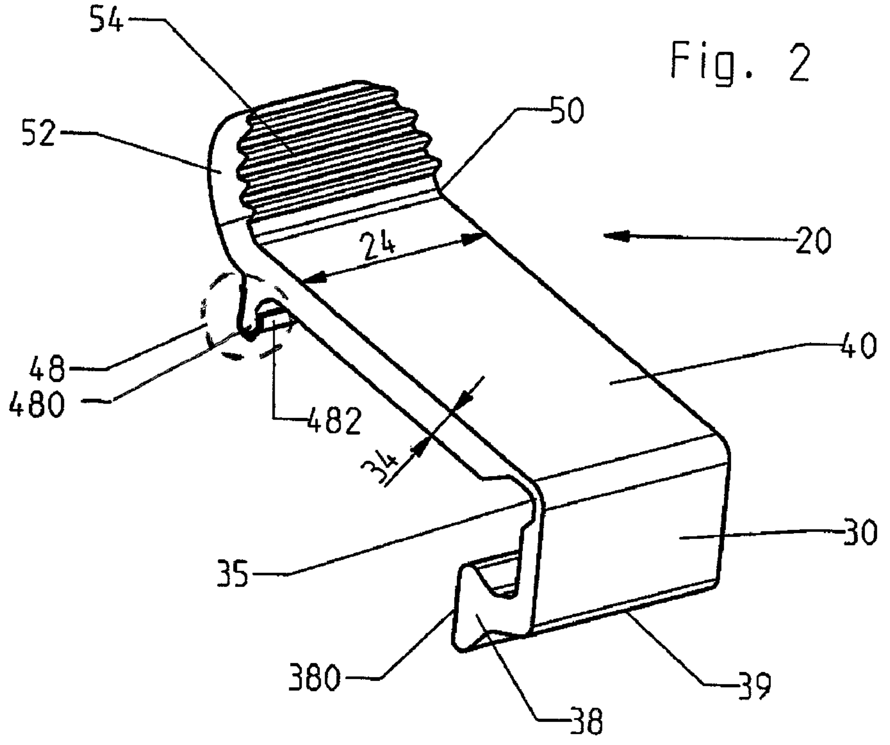
FIG. 2 shows a perspective diagram of an inventive device for pulling out a terminal clamp.

FIG. 2 shows an exemplary embodiment of a device 20 with a fastening section 30 and a grip section 40.

The fastening section 30 and the grip section 40 are designed approximately at a right angle to the rectangular surfaces with plate thicknesses 34. The fastening section 30 and the grip section 40 are joined together by a pivotable connection 35. Parallel to the pivotable connection 35 and facing away from it, the fastening section 30 has a first end 39 and the grip section 40 has a second end 50. The two ends 39, 50 and the pivotable connection 35 extend over the entire width 24 of the device 20, which is embodied in one part.

The pivotable connection 35 acts as a divalent connection. The plate thickness 34 is reduced in the area between the fastening section 30 and the grip section 40 over the entire width 24 of the device to form a film hinge as the pivotable connection 35. The material between the fastening section 30 and the grip section 40 thus has a weakened area in the material which forms the pivotable connection 35.

On the first end 39 of the fastening section 30 facing away from the pivotable connection 35, a first fastening mechanism 38 extending over the entire width 24 of the device 20 is integrally molded. The first fastening mechanism 38 is designed as a first fastening contour 380 having a constant cross section over the entire width 24 of the device. The first fastening contour 380 is designed as a dovetail.

The grip section 40 has a grip strap 52 on the second end 50. The grip strap 52 stands at a grip angle to the grip section 40. The grip strap 52 is definitely shorter than the grip section 40 itself.

The plate thickness of the grip strap 52 corresponds essentially to the plate thickness 34 of the grip section 40.

The grip strap 52 has ribbing parallel to the second end 50. The ribbing is a preferred embodiment of a structured surface 54 which should prevent the user's grip from slipping. The grip strap 52 is rounded on a closing side facing away from the second end 50 and is designed approximately as a flattened semicircle, for example, with the second end 50 as the diameter.

On the second end 50, a second fastening mechanism 48 is integrally molded at a right angle to the grip section 40. The second fastening mechanism 48 is arranged on one side of the grip section 40, while the grip strap 52 is angled at a gripping angle on the other side of the grip section 40. The second fastening mechanism 48 and the first fastening mechanism 38 are arranged on the same side of the device 20. The second fastening device 48 is embodied as a catch hook 480 with a catch hook end 482 and stands approximately perpendicular to the grip section. The catch hook end 482 points in the direction of the pivotable connection 35.

Figure 3:
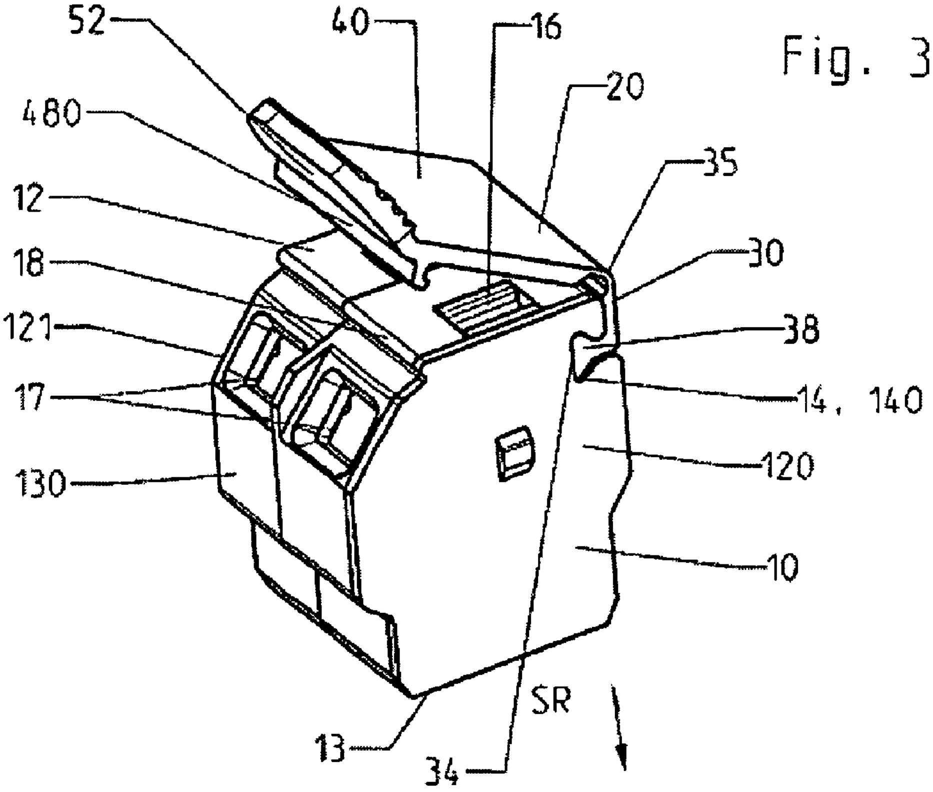
FIG. 3 shows a perspective diagram of an inventive terminal clamp with the device illustrated in FIG. 2 shown here in an open position.
Figure 4:
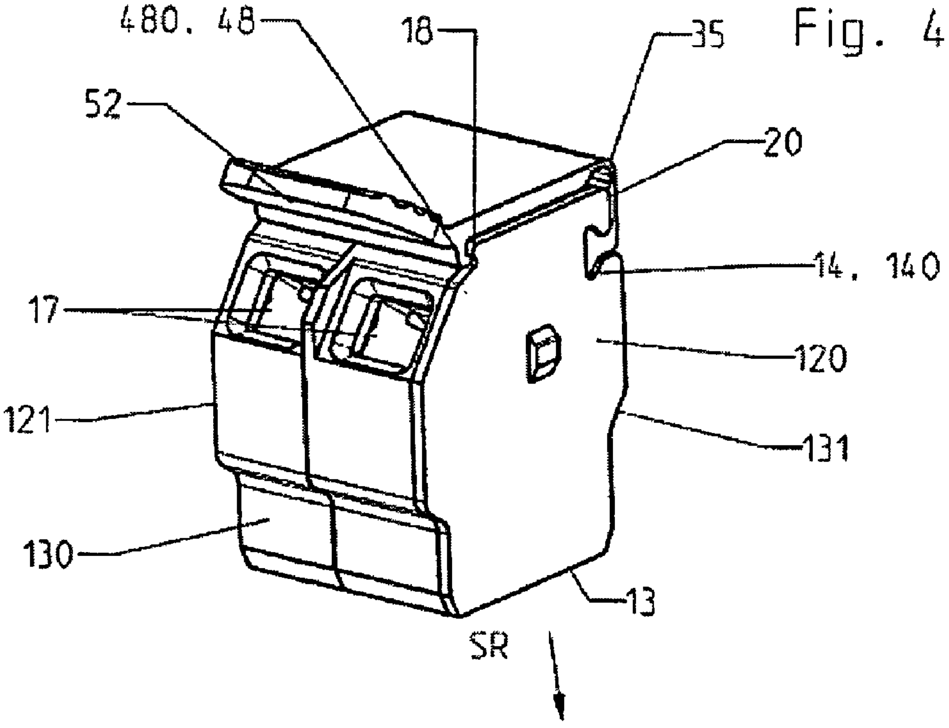
FIG. 4 shows a perspective diagram of the terminal clamp from FIG. 3 with the device illustrated in FIG. 2 in a closed position.

FIGS. 3 and 4 show the exemplary embodiment of a device 20 from FIG. 2 as attached to a terminal clamp 10. The same parts are labeled with the same reference numerals. For a better overview, not all reference numerals are shown in all figures.

The terminal clamp 10 has an external contour which corresponds essentially to a cube. One side of the terminal clamp 10 is a plug side 13 with plugged contacts. The plug contacts are arranged inside the housing. They stand perpendicular to the plug side 13 in a plug-in direction SR. The terminal clamp 10 with the plug side 13 is plugged into a plug connection, e.g., into a pin contact strip in the plug-in direction SR.

The physical side 12 is embodied as another housing side opposite the plug side 13. Between the visible side 12 and the plug side 13 there are four housing walls 120, 121, 130, 131 arranged in pairs opposite one another and perpendicular to the former. These are two side walls 120, 121, one front wall 130 and one rear wall 131. The housing walls are consequently aligned parallel to the plug-in direction SR.

The front wall 130 of the terminal clamp 10 has plug openings 17. Electric conductors can be inserted into the plug openings 17. A terminal contact (not shown) which clamps the electric conductors is arranged in the terminal clamp 10.

In the terminal clamp 10, an electric contact element connects the electric conductors inserted into the plug openings 17 via the terminal contact to the plug contacts arranged in the plug side 13. The corresponding electric conductors can be released when a tool is pressed with a light pressure in the plug-in direction SR into operating openings 16 arranged on the visible side 12 and thus the clamping connection between the clamp contact and the conductor is released.

The device 20 is detachably connected to the first fastening mechanism 38 on a first fastening element 14 on the real wall 131 of the connecting terminal 10. The first fastening element 14 as a second fastening contour 140 lies across the plug-in direction SR and is shaped as a negative dovetail. The first fastening mechanism 38 is inserted into the first fastening element 14 with its first fastening contour 380 aligned to be axially parallel. This forms a releasable tongue-and-groove connection between the device 20 and the terminal clamp 10.

With the fastening section 30, the device 20 is in contact with the rear wall 131 of the terminal clamp 10. The pivotable connection 35 comes to lie approximately at the height of the edge between the visible side 12 and the rear wall 131. The grip section 40 is pivoted opposite the fastening section 30 toward the visible side 12 of the terminal clamp 10. The grip section 40 stands at an angle away from the visible side 12 of the terminal clamp 10 in FIG. 3, whereas in FIG. 4 it is in contact with the visible side 12. FIG. 3 thus shows an opened position while FIG. 4 shows a closed position.

A second fastening element 18 is arranged along a visible edge between the visible side 12 and the front wall 130. Along the visible edge, the second fastening element 18 is embodied as a protrusion with a notch beneath it, allowing engagement of the catch hook 480 and functioning in this way as a catch element. FIG. 4 shows the engagement of the catch hook 480 with its catch hook end 482 in the notch.

The second fastening mechanism 48 is arranged as a catch hook 480 on the second end 50 of the grip section 40 of the device 20 and holds it securely in the closed position when the catch hook 480 becomes engaged with the second fastening element 18.

From the opened position (FIG. 3), the connection between the second fastening element 18 and the second fastening mechanism 48 is closed by pressure on the grip section 40 in the direction of the visible side 12. The catch hook protrusion 480 is pushed over a protrusion along the visible edge between the visible side 12 and the front wall and then engages in the notch.

In this closed position, the device 20 conceals with its grip section 40 the entire visible side 12 of the terminal clamp 10 and in particular also conceals the operating openings 16. The grip section 40 is stowed in a space-saving manner in the closed position because it is in contact with the visible side 12 over its entire rectangular base area. An attached device 20 prevents insertion of electric conductors into the insertion openings 17 because the device 20 is connected to the terminal clamp 10 by means of the second fastening device 48 above the insertion openings 17 on an edge of the front wall 130 facing the visible section 12. To release this connection, one can pull on the grip strap 52 in the direction opposite the plug-in direction SR.

For pulling the terminal clamp 10 out of the plug connection, the grip section 40 is gripped, as it protrudes in the opened position (FIG. 3) and is pulled in the direction opposite the plug-in direction SR. Even if one pulls on the grip section 40 at a slight oblique angle opposite the direction of the plug-in direction SR, it is still possible to release the terminal clamp 10 from the plug connection.

The device 20 and/or the terminal clamp 10 consist(s) preferably of a viscoelastic plastic, in particular a polyamide.

LIST OF REFERENCE NUMERALS

2 Device
10', 10 Terminal clamp
12 Visible side
13 Plug side
14 First fastening element
16 Operating opening
17 Insertion opening
18 Second fastening element
20 Device
24 Width of device
30', 30 Fastening section
34 Plate thickness
35 Pivotable connection
38 First fastening mechanism
39 First end
40', 40 Grip section
48 Second fastening mechanism
50 Second end
52 Grip strap
54 Structured surface
120 Side wall
121 Side wall
130 Front wall
131 Rear wall
140 Second fastening contour
380 First fastening contour
480 Catch hook
482 Catch hook end
SR Plug-in direction

The invention claimed is:

1. A device for pulling out a terminal clamp, comprising:
a fastening section configured for fastening the device on the terminal clamp;
a grip section; and
a second fastening device provided on the grip section and configured for detachable attaching of the grip section to the terminal clamp, wherein the fastening section and the grip section are connected by a pivotable connection, and
the terminal clamp is configured to mate with the fastening section further comprises:
a housing having two opposing side walls,
a front wall,
a rear wall,
a visible side, and
a plug side, wherein
the visible side and the plug side are situated opposite one another and are aligned across a plug-in direction,
the front wall, the rear wall and the side walls are aligned essentially parallel to the plug-in direction, and
operating openings in the visible side.

2. The device according to claim 1, wherein the fastening section has a first fastening mechanism configured for releasable attachment of the device to the terminal clamp.

3. The device according to claim 2, wherein the first fastening mechanism further comprises a first fastening contour in the form of a dovetail.

4. The device according to claim 2, wherein the first fastening mechanism is on a first edge of the fastening section facing away from the pivotable connection.

5. The device according to claim 1, wherein the pivotable connection is a film hinge.

6. The device according to claim 1, wherein the second fastening device is on a second end of the grip section facing away from the pivotable connection.

7. The device according to claim 1, further comprising a catch hook attached to the second fastening device.

8. The device according to claim 1, further comprising a grip strap arranged on the grip section.

9. The device according to claim 8, wherein the grip strap is arranged at an angle to the grip section.

10. The device according to claim 8, wherein the grip strap has a structured surface.

11. The device according to claim 8, wherein the grip strap has a ribbed surface.

12. The device according to claim 1, wherein the device is made of a viscoelastic plastic.

13. The device according to claim 1, wherein the device is made of a polyamide.

14. The device according to claim 1, further comprising a second fastening element configured to engage with the second fastening mechanism.

15. The device according to claim 14, further comprising a catch hook attached to the second fastening element.

16. The device according to claim 14, wherein the second fastening element fits between the visible side and the front wall.

17. The device according to claim 1, wherein the terminal clamp further comprises a first fastening element configured to mate with a first fastening mechanism.

18. The device according to claim 17, wherein the terminal clamp first fastening element further comprises a second fastening contour having a negative dovetail which corresponds to a first fastening contour of the fastening section.

19. The device according to claim 18, wherein the second fastening contour lies across the plug-in direction.

20. The device according to claim 17, wherein the first fastening element is on the rear wall.

21. A device for pulling out a terminal clamp, comprising:
a fastening section configured for fastening the device on the terminal clamp;
a grip section; and
a second fastening device provided on the grip section and configured for detachable attaching of the grip section to the terminal clamp, wherein the fastening section and the grip section are connected by a pivotable connection, and
the terminal clamp is configured to mate with the fastening section further comprises:
a housing having two opposing side walls,
a front wall,
a rear wall,
a visible side, and
a plug side, wherein
the visible side and the plug side are situated opposite one another and are aligned across a plug-in direction,
the front wall, the rear wall and the side walls are aligned essentially parallel to the plug-in direction, and wherein
the device is configured such that, when in a closed position, the device is in contact at its grip section with the visible side of the terminal clamp, when a second fastening element mates with the second fastening device.

* * * * *